Figure 1:
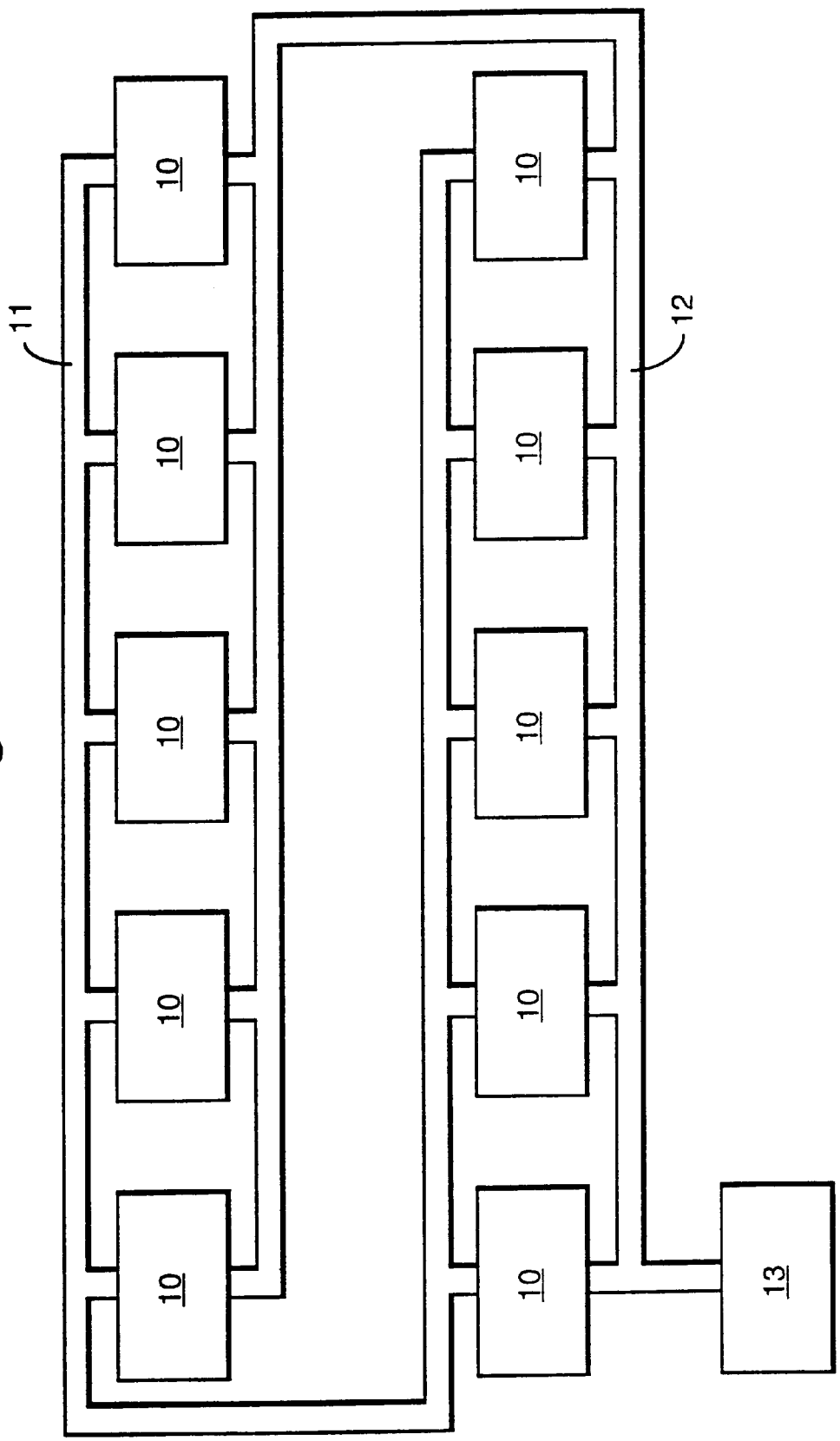

United States Patent [19]
Roe et al.

[11] Patent Number: 6,094,714
[45] Date of Patent: Jul. 25, 2000

[54] MULTI-SEQUENTIAL COMPUTER FOR REAL-TIME APPLICATIONS

[75] Inventors: Jonathan Roe, Portsdown; Anthony Pudner; Alan Michael, both of Bracknell, all of United Kingdom

[73] Assignee: The Secretary of State for Defence in Her Britannic Majesty's Government of the United Kingdom of Great Britain and Northern Ireland, Farnborough, United Kingdom

[21] Appl. No.: 08/894,184

[22] PCT Filed: Mar. 19, 1996

[86] PCT No.: PCT/GB96/00659

§ 371 Date: Aug. 14, 1997

§ 102(e) Date: Aug. 14, 1997

[87] PCT Pub. No.: WO96/29647

PCT Pub. Date: Sep. 26, 1996

[30] Foreign Application Priority Data

Mar. 20, 1995 [GB] United Kingdom .................. 9505566

[51] Int. Cl.[7] .......................................... G06F 9/44
[52] U.S. Cl. ................................ 712/17; 712/14; 712/11
[58] Field of Search ................................ 712/17, 16, 14, 712/11

[56] References Cited

U.S. PATENT DOCUMENTS 5,163,133 11/1992 Nelson et al. .
5,247,307 9/1993 Olivier et al. .

OTHER PUBLICATIONS

Roe et al., "The Application of Artificial Intelligence Techniques to Naval ESM Radar Indentification" 1994, pp. 565–572.

Practical Application of Prolog. The Proceedings of the Third International Conference on the Practical Application of Prolog, Proceedings PAP'95. The Third International Conference. Practical Application of Prolog, Paris, France, Apr. 3–6, 1995, ISBN–0–9525554–0–9, 1995, Blackpool, UK, Alinmead Software, UK, pp. 281–292, XP000574616 Hawkes R et al: "A real–time Prolog solution for naval ESM radar identification". See the whole document.

(List continued on next page.)

*Primary Examiner*—Larry D. Donaghue
*Attorney, Agent, or Firm*—Nixon & Vanderhye P.C.

[57] ABSTRACT

A parallel processing system computer which utilizes the logic programming language Prolog comprising a plurality of processing nodes, each node comprising three central processing units (CPUs), a memory architecture adapted for Prolog execution and interfacing hardware, each processing node being connected to a communication bus and a real-time broadcast bus whereby the real-time data from an input can be broadcast via the real-time broadcast bus to each processing node. One of the CPUs is used to control the communications and scheduling of the node, the other two CPUs are used as sequential Prolog Processors (SPPS). Each node can be arranged such that the collection of unused memory is carried out by one SPP while another SPP continues to run Prolog program enabling continuous real-time operation. The memory architecture is hybrid and comprises local static RAM and global dynamic RAM. The dynamic RAM comprises a Prolog database of known signal for comparison with the real-time input signals.

12 Claims, 2 Drawing Sheets

OTHER PUBLICATIONS

Conference on Computer Workstations, Santa Clara, Mar. 7–10, 1988, No. Conf. 2, Mar. 7, 1988, Institute of Electrical and Electronics Engineers, pp. 60–69, XP000092709 Fu H C et al: "A Multi–Processor System for Prolog Processing" see p. 60, right–hand column, line 13—p. 61, right–hand column, line 2; figure 2.1 See paragraph 5, see paragraph 6.

Information Processing, San Francisco, Aug.28–Sep.,1, 1989, No. Congress 11, Aug. 28, 1989, Ritter G X, pp. 627–632, XP000079018, Kazuo Taki: The FGCS Computing Architecture: see paragraph 3.2, see paragraph 3.3, see paragraph 3.4, see paragraph 3.6.

IEE Colloquium on 'Signal Processing in Electronic Warfare')Digest No. 1994/025) IEE Colloquium on 'Signal Processing in Electronic Warfare'(Digest No.1994/025), London, UK, Jan. 31, 1994, London UK, IEE, UK, pp. 7/1–6, XP002007332 Roe J et al: "The real–time implementation of emitter identification for ESM" see p. 6, lien 1–line 10.

MULTI-SEQUENTIAL COMPUTER FOR REAL-TIME APPLICATIONS

The invention relate s to computers for use with real-time applications and in particular though not exclusively to computers implementing applications involving a high degree of parallel processing and making use of the Prolog language.

One of the major advantages of the radar ESM sensor is its potential ability to accurately identify platforms which are radiating in the radar band through the identification of their radar equipments. To an ESM system designer the term identification usually means the final stage of processing in the software element of an ESM system (the ESM processor). It is therefore seen primarily as a software entity which consists essentially of an ESM library and an identification program or algorithm. The library describes the characteristics of the objects to be identified by the identification algorithm. The library may consist of radar descriptions, radar platform descriptions, or more complex objects. The identification algorithm may be defined as a set of algorithms where, for instance, different algorithms are used for emitter identification. This invention is to be described in relation to emitter identification. Emitter identification is generally interpreted as identification of emitter type. The interpretation can also be extended to include identification of emitter mode and specific radar emitter unit. Current emitter identification algorithms in ESM systems use relatively simple matching techniques to compare ESM tracks against an ESM library containing crude emitter descriptions. Research is currently aimed at devising better identification algorithms using a Knowledge Based Systems (KBS) approach to the analysis of the identification problem and the design of identification algorithms.

While research into the KBS approach has proved to be successful in producing an emitter identification algorithm with greatly improved performance levels, it is recognised that the design of successful advanced research software is not enough in itself to solve the identification problem for practical systems. It is also necessary to provide a vehicle for real-time implementation of advanced identification algorithms.

The inventors have been using a logic programming language Prolog for programming a suitable Knowledge Based System for radar emitter identification. This programme is known as PALANTIR. The PALANTIR program has an emitter library and conducts complex matching of ESM tracks against its emitter library. This matching process takes account of all emitter parameter agility information and reasons about the uncertainty in the ESM track data, the matching process itself and the uncertainty in the emitter library data.

Two levels of response are needed from an operational radar identification system:

a) a fast response that is required for threat warning and subsequent provision of data to electronic countermeasures systems. This response level is very demanding, even for simple identification systems, particularly if more than one ESM track is to be processed.

b) a slow surveillance response which is much less demanding.

The rapid response for threat warning and the complex KBS program PALANTIR make use of Prolog on conventional general-purpose computers ineffective for both levels of response.

The inventors have found that there is no computer architecture available that will provide a very high Prolog execution capability within a real-time environment.

The object of the present invention is to provide a suitable computer capable of exploiting data parallelism to proved high performance real-time Prolog execution.

The invention comprises: a parallel processing computer arranged for direct execution of logic programming language Prolog comprising a plurality of processing nodes: each processing node comprising three central processing units (CPUs), a memory architecture adapted for Prolog execution and interfacing hardware; each processing node being connected to a communications bus and a real-time broadcast bus whereby real-time data from an input can be broadcast via the real-time broadcast bus to each processing node.

One of the CPUs may be directed at the management of communications and scheduling for the node and the other two CPUs are connected as sequential Prolog processors (SPPS) that are directed towards fast execution of sequential Prolog programs. Prolog programs may advantageously be divided between SPPs on the same node and on different nodes. This conveniently allows parallel execution and communications between the SPPs with control of the parallel execution. Preferably a node is arranged such that collection of unwanted used memory is carried out on one SPP while the other SPP continues to run Prolog programs thus enabling continuous operation required for real-time systems.

Preferably the memory architecture is hybrid and comprises local static random access memory (SRAM) and global dynamic random access memory (DRAM).

The memory may be arranged such that memory accesses that can be serviced within one of the SPP's local SRAM cause its access to the global DRAM to be suspended. This allows the other SPP free access to the DRAM thereby avoiding internal bus contention.

Preferably a Prolog database is held within the computer's DRAM and conveniently direct support is provided in hardware for searching for numeric information within the database. This yields significant improvements in performance over a software based search and is particularly advantageous for ESM identification systems.

In a preferable arrangement the DRAMs of a processing node are arranged in two interleaved banks and there is provided an interleave DRAM controller to provide interleave and page control; the arrangement being such that the DRAM can only be accessed in burst mode and the interleaving and page access capabilities maximise the burst transfer rates.

In an arrangement particularly suitable for identification of a received signal by comparison against a library collection of known signals each node is arranged so as to store a condensed version of the library signals in a scan memory with each library signal having a unique identifying number, key scan parameters essential for a matching algorithm stored in the computer are derived from the received signal and also stored in the scan memory; the key scan parameters are compared by means of a comparator against the library signals with any match causing the relevant library signal identifying number to be stored in a scan match FIFO.

Preferably the DRAM uses Ramtron technology incorporating DRAM and page caching in the same device. One type of communications bus is a VME bus.

Advantageously each processing node includes a receive First In First Out (FIFO) connected to a real-time interface for connection to the real-time broadcast bus. Preferably each node comprises a Schedule Processor (SP) controlling two Sequential Prolog Processors (SPPs), each SPP comprising a processor and a memory unit that can be selectively isolated from the rest of the computer under control of a system bus arbitrator arranged to independently arbitrate the data and address buses such that a bus can be released at the earliest possible time after successful arbitration.

Figure 2:
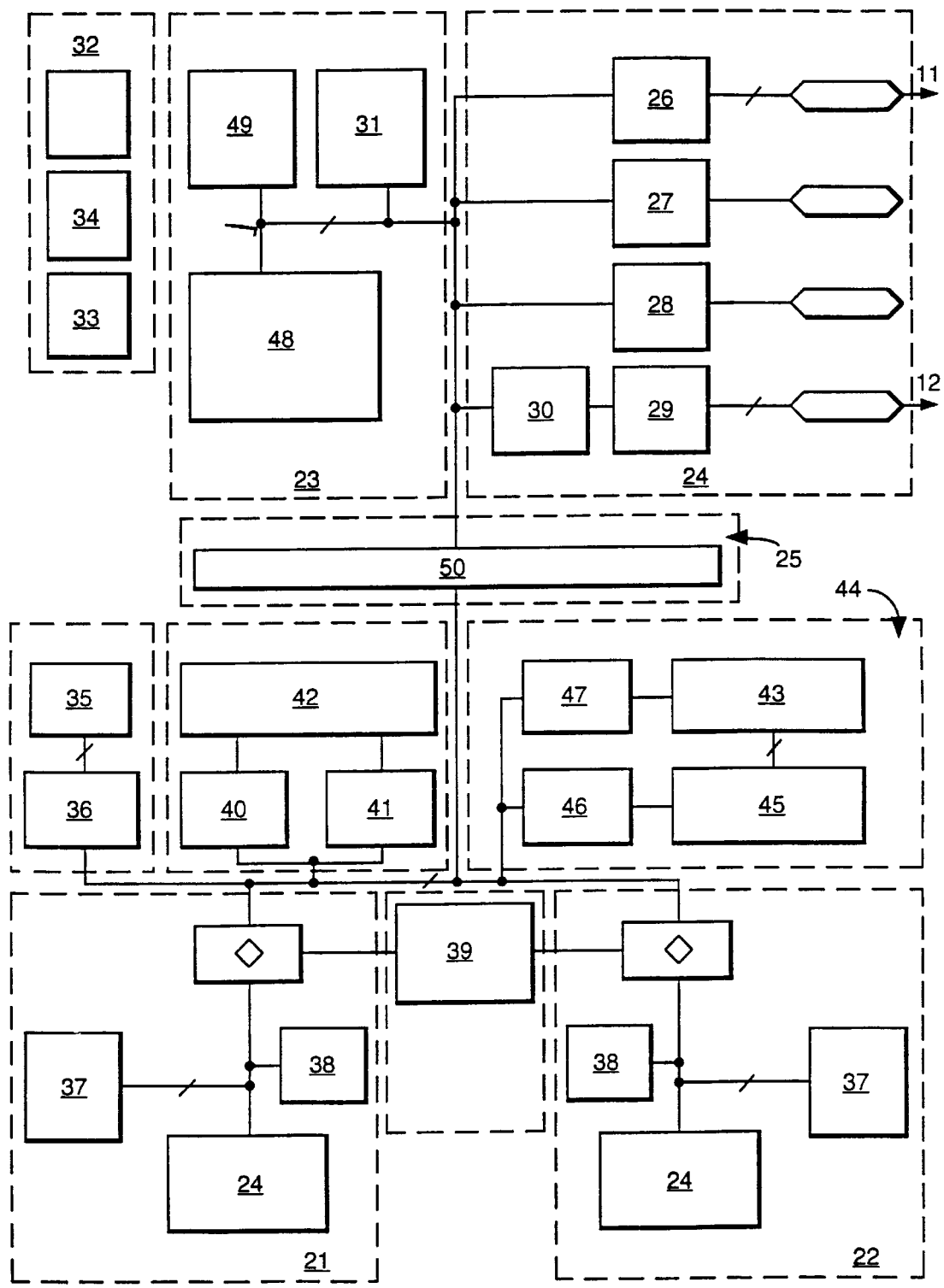

The invention will now be described by way of example only with reference to the accompanying Drawings of which:

FIG. 1 shows a block schematic diagram of a computer according to the invention; and FIG. 2 shows a more detailed block diagram of one of the nodes of the FIG. 2 computer.

The computer as shown in FIG. 1 comprises a Prolog processing node 1 and a number of nodes 10 (numbered 1–9 as shown) communicating over two buses 11 and 12. The computer is designed specifically for applications which exhibit a high degree of data parallelism suited to a multi-sequential system. The main communications bus 11 is the industry standard VME bus extended to 64 bits. The second bus 12 is a real-time data highway. It is a fast 32-bit real-time bus with a DMA capability into each node. The real-time bus 12 has a broadcast facility permitting simultaneous transmission into each program store I and designed for the rapid transmission of real-time data from input unit 13 to the Prolog processors 10. This feature, combined with a real-time operating system resident at each Prolog processing node 10, preserves the real-time environment.

The choice of control processor unit (CPU) for use with Prolog was determined by the characteristic of Prolog in having a high degree of program indirection. This indirection manifests itself as a series of conditional tests and branches. Branches arise due to:

(1) Read/write modes.
(2) Unification tag testing.
(3) Switch on register contents.
(4) Clause indexing.
(5) Unification failure and backtracking.

One advantage of using an advanced compiler is that by means of program analysis a proportion of the indirection is compiled out of the program. However, a significant proportion of the program indirection remains and will result in an inefficient implementation unless the processor incorporates specific support for program indirection. The support that is required is in the design of the processor pipeline. A long pipeline with no support for indirection will require complete flushing at each indirection. The main architectural features required for the support of Prolog are:

(1) The instruction pipeline should be short.
(2) The pipeline should incorporate branch prediction logic. This might include static and dynamic branch prediction, delayed branching, early branch resolution or branch target caching.
(3) The processor should include internal parallelism. This should take the form of a super-scalar as opposed to a super-pipelined architecture.

In addition the following criteria were applied for the memory and bus interface architecture:

(1) The processor memory bandwidth should be as high as possible. This is a combination of the databus clock rate as well as the bus width. The processor should ideally combine a high bus clock rate with a 64-bit bus size and a sophisticated bus interface controller. The bus interface controller should operate independently of the ALU's such that external memory accesses are initiated prior to the data being required.
(2) The memory hierarchy should be defined such that, as far as possible, memory accesses remain internal to the processor. This requires internal caching and ideally a large internal register set.
(3) An internal set-associative cache with a high degree of associativity. Due to the high proportion of writes to reads the cache should be used in copyback mode.
(4) A Harvard architecture should be used. This separates instruction and data accesses thereby potentially doubling the internal bandwidth. An ideal arrangement is for the Harvard architecture to be externally accessible. However, this is only available on some Digital Signal Processor (DSP) devices. The standard configuration is for an internal Harvard architecture to be supplemented with an internal cache.
(5) Prolog memory accesses are tagged. The computer memory architecture will incorporate the tag within the 32-bit memory cell. The insertion, extraction, modification and testing of these tags will require effective bitfield instructions within the processor instruction set.

Other features required for the processor function are as follows:

(1) Fast arithmetic capability. Fast Prolog execution emphasises the requirement for ALU as opposed to Floating Point (FPP) capability. The predominant requirement is for fast address, tag and integer comparisons.
(2) A powerful memory management unit. This will provide the necessary support for:
  (i) Detection stack collisions.
  (ii) Identifying global and locally-accessible stack areas.
  (iii) Performing the translation between tagged and non-tagged addresses.
(3) The processor should support super-scalar instruction execution.

On the basis of all of the above criteria a Motorola PowerPC 604 processor was selected.

The computer architecture is based on a sequential Prolog processor with a capability approaching 10 MLIP for the standard Naive Reverse benchmark. As shown with further reference to FIG. 2 the basic Prolog processing node comprises two sequential Prolog processors (SPPS) 21 and 22 integrated with a Scheduler Processor (SP) 23. The SP 23 controls the operation of each SPP 21, 22 and manages the database parallelism through a System Interface 24 as well as the real time control of the computer through an Inter-Processor Communications Unit 25. The System Interface 24 includes a parallel VME-64 connection 26. a serial Ethernet connection 27. 3 serial RS232 ports 28 and a parallel Real-Time Interface 29. The Real-Time Interface 29 is connected to the SPPs 21 and 22 by means of a First In First Out (FIFO) 30. The SP 23 includes a DMA controller 31 and a System Control 32 includes a System Interrupt control 33 as well as reset/abort circuitry 34.

The computer as shown in FIG. 1 integrates a number of the nodes within a real-time multisequential environment. The architecture is both highly scaleable and is designed to meet the stringent requirements of real-time operation of programs such as PALANTIR. The SPPs 21,22 execute a modified version of the Aquarius compiler developed at the University of Southern California. The compiler has been extended for operation on the PowerPC Processor. In addition, specialist memory areas have been incorporated that enhance the operation of Prolog in the identification algorithm. These are indicated by the EPROM 35 and the EPROM Controller/Multiplexer 36.

Each Sequential Prolog Processor (SPP) 21,22 comprises a single Motorola 604 PowerPC Processor 24 operating at 100 MHz. Each SPP has its own local memory 37 (1 Mbyte fast SRAM) and may be isolated from the rest of the system if required by a local remote control unit 38. This permits the external system bus bandwidth to be maximised by independently arbitrating the data and address buses by means of a system bus arbitrator 39. The arbitration schemes are designed such that the bus is released at the earliest possible time after successful arbitration.

The main memory for Prolog processing is a DRAM. The DRAM is configured as two interleaved banks 40, 41 each of size 4 Mbyte giving a total of 8 Mbyte. The DRAM banks 40 41 are controlled by an Interleave DRAM controller 42. This memory may only be accessed in burst mode and utilises the interleaving and page access capabilities to maximise burst transfer rates. The DRAM uses state-of-the-art Ramtron technology that incorporates both DRAM and a page cache within the same device. With a 66 MHz bus clock memory accesses of 3-1-1-1 for a cache hit and 4-1-1-1 for a cache miss have been achieved. This is extremely fast and approaching the burst transfer capability of secondary caches.

Enhanced scanning hardware has been incorporated that executes directly in hardware the major part of the matching algorithm required for the PALANTIR program. The scan hardware operates by storing a condensed version of the emitter library in a scan memory 43 of a basic Match Scanner 44 within 128 bits. Scanning is instigated by storing the scan parameters essential for the matching algorithm in the scan hardware. When scanning is commenced these key parameters are compared by means of a Scan Comparator 45 under control of a Scan Controller 46 against the emitter modes stored in the scan memory 43. Any match causes the relevant emitter mode number to be stored in a scan match First In First Out (FIFO) 47. The emitter modes are available to be read and subsequently passed on to the rest of the PALANTIR program.

Each computer node 10 comprises one SP 23 and two SPPs 21,22. The functions of the SP 23 are to:

(1) To control and direct the operation of the 2 SPPS.

(2) To control and monitor the exploitation of the data parallelism at the SPPS.

(3) To manage the real-time operating system, including the message queuing for the signal-based real-time operating system and task pre-empting/prioritisation.

(4) Manage the input/output of data over both the ethernet and the backplane communications.

The design of the SP 23 must therefore take into account the above functions. The primary tasks of the SP 23 is the management of the communications and of control of the SPPS. All communications between SPPs are controlled, directed and filtered by the SP 23. Thus in the case of a message being sent to a SPP from another SPP the message if filtered by the SP associated with the receiving SPP. This avoids any problems associated with flooding the receiving SPP with messages. Any messages received by an SPP represent a higher priority task than that currently being executed, and therefore require the suspension of the current processing.

The Scheduler Processor 23 is based on the Motorola 68360 controller comprising a 68020 core 48 with extensive communications facilities. The communications facilities include:

(a) Three RS 232 ports (28).

(b) One ethernet port (27).

(c) DMA (31)and interrupt control facilities (33) as required for a communications sub-system.

The Scheduler Processor 23 also has 512 Kbytes of EPROM and 512 Kbytes of zero-wait-state 32 bit SRAM, indicated by reference numeral 49.

Inter-processor communications is effected by means of a bi-directional FIFO 50 in the Inter Processor Communications Unit 25 which permits asynchronous communication between all 3 processors on the computer node 10. The capacity of the FIFO 50 is 4 kbyte in either direction and is configured as a 32-bit interface. The interprocessor communications interface also has 12 PIO lines. These are under the control of the Scheduler Processor 23 and effect the highest level control—RESET, ABORT, HALT and INTERRUPT (as indicated within the System Control 32)—over each SPP.

We claim:

1. A parallel processing computer arranged for direct execution of the logic programming language Prolog comprising a plurality of processing nodes; each processing node comprising three central processing units (CPUs), a memory architecture adapted for Prolog execution and interfacing hardware; each processing node being connected to a communications bus and a real-time broadcast bus whereby real-time data from an input can be broadcast via the real-time broadcast bus to each processing node.

2. A parallel processing computer as claimed in claim 1 wherein one of the CPUs is directed at the management of communications and scheduling for the node and the other two CPUs are connected as sequential Prolog processors (SPPS) that are directed towards fast execution of sequential Prolog programs.

3. A parallel processing computer as claimed in claim 2 wherein Prolog programs are divided between SPPs on the same node and on different nodes.

4. A parallel processing computer as claimed in claim 1 wherein a node is arranged such that collection of unwanted used memory is carried out on one SPP while another SPP continues to run Prolog programs thus enabling continuous operation required for real-time systems.

5. A parallel processing computer as claimed in claim 1 wherein the memory architecture is hybrid and comprises local static random access memory (SRAM) and global dynamic random access memory (DRAM).

6. A parallel processing computer as claimed in claim 5 wherein the memory is arranged such that memory accesses that can be serviced within one of the SPP's local SRAM cause its access to the global DRAM to be suspended.

7. A parallel processing computer as claimed in claim 6 wherein a Prolog database is held within the computer's DRAM and direct support is provided in hardware for searching for numeric information within the database.

8. A parallel processing computer as claimed in claim 7 wherein the DRAMs of a processing node are arranged in two interleaved banks and there is provided an interleave DRAM controller to provide interleave and page control; the arrangement being such that the DRAM can only be accessed in burst mode and the interleaving and page access capabilities maximise the burst transfer rates.

9. A parallel processing computer as claimed in claim 1 wherein the computer is arranged so as to store a library collection of known signals and each node is arranged to store a condensed version of the library signals in a scan memory with each library signal having a unique identifying number, and key scan parameters essential for a matching algorithm stored in the computer are derived from a received signal and also stored in the scan memory; the arrangement being such that the key scan parameters are compared by means of a comparator against the library signals with any match causing the relevant library signal identifying number to be stored in a scan match first in first out circuit (FIFO).

10. A parallel processing computer as claimed in claim 5 wherein the DRAM uses Ramtron technology incorporating DRAM and page caching in the same device.

11. A parallel processing computer as claimed in claim 1 wherein each processing node includes a receive First In First Out (FIFO) connected to a real-time interface for connection to the real-time broadcast bus.

12. A parallel processing computer as claimed in claim 11 wherein each node comprises a Schedule Processor (SP) controlling two Sequential Prolog Processors (SPPs), each SPP comprising a processor and a memory unit that can be selectively isolated from the rest of the computer under control of a system bus arbitrator arranged to independently arbitrate the data and address buses such that a bus can be released at the earliest possible time after successful arbitration.

* * * * *